Figure 1:
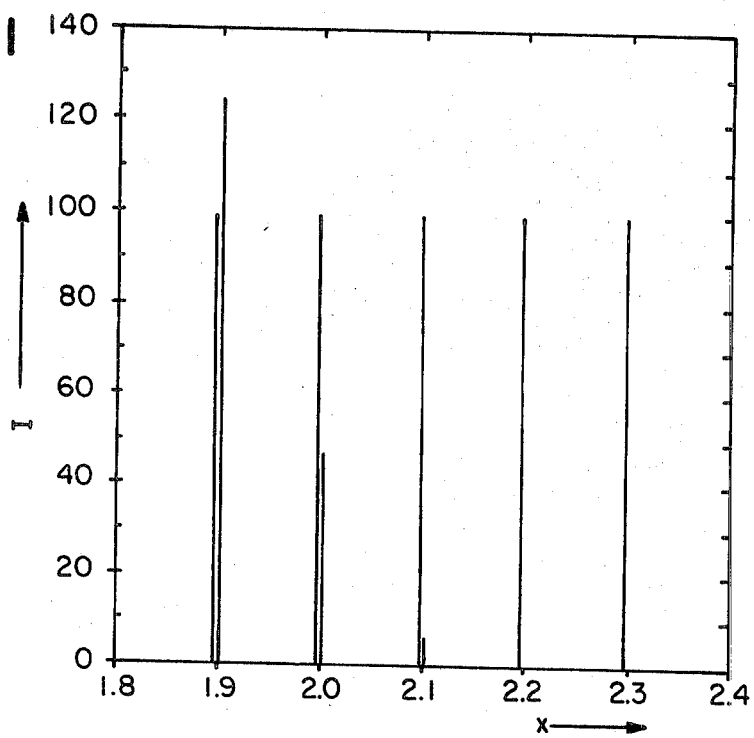

United States Patent [19]

von Alpen et al.

[11] 4,394,280

[45] Jul. 19, 1983

[54] ION CONDUCTIVE MIXED CRYSTAL

[75] Inventors: Ulrich von Alpen, Schlossborn; Reinhard Bräutigam, Hofheim; Antony Oliapuram, Frankfurt, all of Fed. Rep. of Germany

[73] Assignee: Varta Batterie A.G., Hanover, Fed. Rep. of Germany

[21] Appl. No.: 369,364

[22] Filed: Apr. 19, 1982

[30] Foreign Application Priority Data

Jun. 11, 1981 [DE] Fed. Rep. of Germany ....... 3123099

[51] Int. Cl.$^3$ .............................................. H01G 9/02
[52] U.S. Cl. .................................. 252/62.2; 429/104; 429/191; 429/193
[58] Field of Search ...................... 429/104, 191, 193; 252/62.2

[56] References Cited

U.S. PATENT DOCUMENTS

| 4,049,891 | 9/1977 | Hong et al. | 429/193 |
| 4,166,159 | 8/1979 | Pober | 429/193 |
| 4,237,200 | 12/1980 | Weddigen | 429/104 |
| 4,322,485 | 3/1982 | Harrison et al. | 429/193 |

Primary Examiner—O. R. Vertiz
Assistant Examiner—Jackson Leeds
Attorney, Agent, or Firm—Weiser, Stapler & Spivak

[57] ABSTRACT

A mixed crystal of the general composition

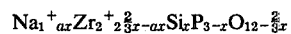

with $0.8 \leq a \leq 0.9$ and $1.8 \leq x \leq 2.3$, has a particularly favorable Na-ion conductivity, particularly when $a=0.88$ and $x=2.2$. This makes its use desirable as the solid electrolyte in Na/S cells. The high density of the single phase monoclinic crystallized material, which reaches almost 3.10 g/cm$^3$, is the result of high temperature sintering, carried out in pure oxygen.

2 Claims, 4 Drawing Figures

ION CONDUCTIVE MIXED CRYSTAL

The invention relates to a mixed crystal for use as the ion conducting solid electrolyte in galvanic elements and which is formed of the components $Na_2O$, $ZrO_2$, $P_2O_5$ and $SiO_2$.

In synthesizing mixed crystals of the general formula $Na_{1+x}Zr_{2-\frac{1}{3}x}Si_xP_{3-x}O_{12-\frac{2}{3}x}$, in which x can assume numerical values between 0.01 and 3, there were produced in accordance with prior German patent application No. P 30 32 894 the compounds $Na_4Zr_{1.5}Si_3O_{11}$, $Na_4Zr\,Si_3O_{10}$, and $Na_4Zr_{0.5}Si_3O_9$, in which x=3, and therefore phosphorus is not present. In a four component system with the terminal members $ZrO_2$, $P_2O_5$, $SiO_2$ and $Na_2O$, the above-mentioned compounds therefore constitute peripheral phases. In a spatial representation of the four component system, they are located in the tetrahedral surface defined by the terminal members $ZrO_2$, $SiO_2$, and $Na_2O$, more specifically: at the quasi-binary section through this surface between $ZrO_2$ and the formal compound $Na_4Si_3O_8$.

When X=0 in the above formula, there is created the Si-free mixed crystal $Na\,Zr_2P_3O_{12}$, which is also a peripheral phase, and which is located in the above-mentioned four component diagram in the tetrahedral surface defined by the terminal members $ZrO_2$, $P_2O_5$ and $Na_2O$.

The known mixed crystals, which can be described by the initially mentioned general formula, have their existence spectrum in the field which is defined by the three terminal members $Na\,Zr_2P_3O_{12}$, $Na_4Zr_{1.5}Si_3O_{11}$ and $Na_4Zr_{0.5}Si_3O_9$.

It has now been observed that these existing mixed crystals can be obtained as rhomboidal compounds with good ion conductivity, as in the adjacent and longer known NASICON system, $Na\,Zr_2P_3O_{12}\ldots Na_4Zr_2Si_3O_{12}$. This is so when x does not exceed the value 1.6 in the general formula. These crystals are further characterized by phase purity, whereas the NASICON mixed crystals are not known to be phase pure. For values higher than 1.6, however, there were found in the mixed crystal field, including the peripheral phases $Na_4Zr_{0.5}Si_3O_9$, $Na_4ZrSi_3O_{10}$ and $Na_4Zr_{1.5}Si_3O_{11}$, monoclinic mixed crystals which can also be represented as phase pure and also exhibit a high degree of crystallization. Compared with the rhomboidal phase they are particularly characterized by a substantially enhanced conductivity, which amounts at 300° C. to about $1.6\times 10^{-3}\Omega^{-1}\,cm^{-1}$.

Because the stability relative to sodium of single phase monoclinic mixed crystals is not completely satisfactory, the principal object of the present invention is to identify in the vicinity of the existence spectrum of known mixed crystals, additional mixed crystals which exhibit long term stability at a temperature of 300° C., both chemically and electrochemically relative to sodium, which have high ion conductivity at the same temperature, which can be produced as sinter bodies of high density and phase purity.

These and other objects which will appear are achieved in accordance with the present invention by a compound which is represented by the general formula

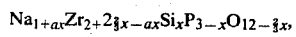

wherein a is a constant having a numerical value between 0.8 and 0.9, and x is a variable parameter with numerical values of 1.8 to 2.3.

The series of mixed crystals embodying the invention is characterized by a composition in which, depending upon the magnitude of the variable parameter x, a reduction of the Na content by 10 to 20 mole% is compensated by a complementary addition of Zr in stoichiometric manner. The quantity of oxygen corresponding to the Na and Zr is thereby redistributed between the two metals, depending upon the value of a. Overall, however, the O-content does not change appreciably.

The mixed crystal composition according to the invention therefore has the smaller Na-portion $1+ax$ and the larger Zr portion $2-(\frac{1}{3}x-(1-ax))$. By transposition there is obtained $$2 - (\tfrac{1}{3}x - (1-a))x$$
$$= 2 - (\tfrac{1}{3} - 1 + a)x$$
$$= 2 - (-\tfrac{2}{3} + a)x$$
$$= 2 + \tfrac{2}{3}x - ax$$

and thereby the original mixed crystal formula.

Through this reduction of the Na content, enhanced Na-ion conductivity exists in the mixed crystal embodying the invention. There are, of course, limits to the below-stoichiometric Na content, at an Na-deficit of 15–20 mole%, if this material is to remain mono-phasic. The permissible content reduction of Na can therefore be expressed by numerical values of a between 0.8 and 0.9.

Zircon and sodium are built into the lattice of mixed crystals embodying the invention in the form of $NaO_6$, or $ZrO_6$ octohedrons. From the crystal chemical standpoint, this means that $ZrO_6$ octohedrons are present in the lattice in place of $NaO_6$ octohedrons. These increase the stability, without change in oxygen content. This circumstance also makes it possible to represent the exchange of Na with Zr in the formula of the mixed crystal embodying the invention by the introduction of a single constant, namely a.

The $ZrO_2$ content of the subject compound plays a decisive role in the stability relative to sodium.

In prior experiments starting with NASICON, $Na_{1+x}Zr_2Si_xP_{3-x}O_{12}$, the $ZrO_2$ content was reduced by $\frac{1}{3}x$ to prevent $ZrO_2$ segregation. Simultaneously, a parameter y was introduced which permits a certain increase of the $ZrO_2$ content in a small range of variation for enhanced stability. As compared with the formula which takes these measures into account

with parameters $0.01 \leq x \leq 3$; $0 \leq y \leq 0.5$, the mixed crystal formula embodying the invention yields a stoichiometry reduction of the Na, due to the introduction of the factor $0.8 \leq a \leq 0.9$, wherein the below-stoichiometry of $O_2$ is eliminated because the y factor for $O_2$ is always 0, whereas it is greater than 0 for Zr.

A preferred compound of the mixed crystal series embodying the invention has the composition $Na_{2.94}Zr_{1.54}Si_{2.2}P_{0.8}O_{10.53}$. This is defined in the general formula by the parameter values a=0.88 and x=2.2.

For use as a separator in electrochemical cells, this composition is preferred because no free $ZrO_2$ is observed during its preparation. This means that the $ZrO_2$ is fully built into the lattice and does not crystallize out on the crystal surfaces.

The specific procedure used during sintering is also of inventive significance for the quality of the mixed crystal. It has been found that the presence of a pure oxygen atmosphere contributes equally to the increase in density and in ion conductivity. In accordance with the invention the components of the mixed crystal are mixed in finely powdered form in those molar fractions which are necessary for a particular desired composition. They are then sintered at the highest possible temperature, e.g. approximately 1200° C., but while avoiding the creation of a liquid phase, in a pure oxygen stream or in an oven filled with oxygen, for a sufficient period of time that no $ZrO_2$ peak can be detected in a x-ray diagram.

Figure 2:
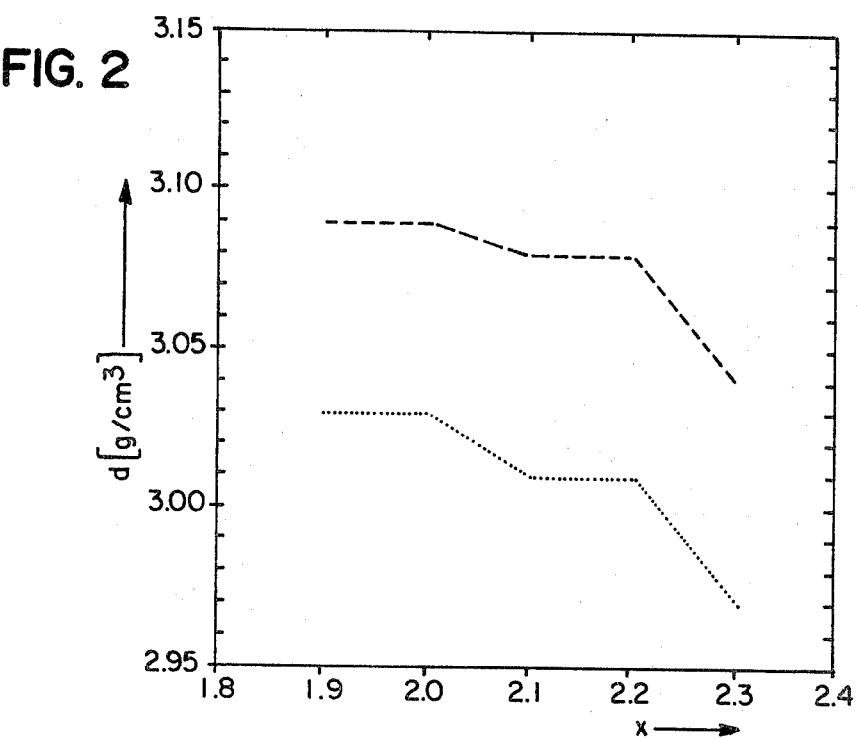
Figure 3:
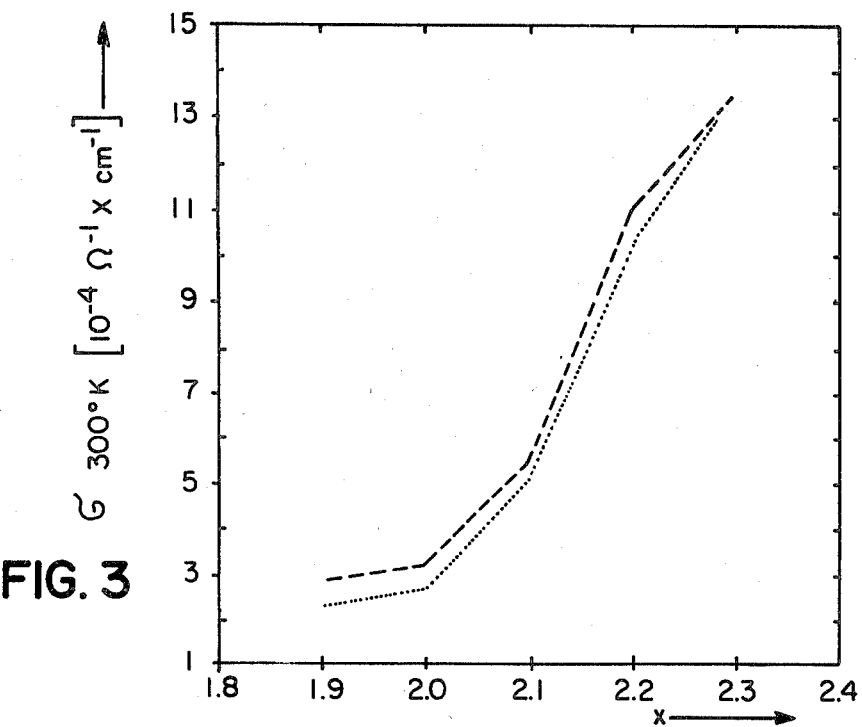
Figure 4:
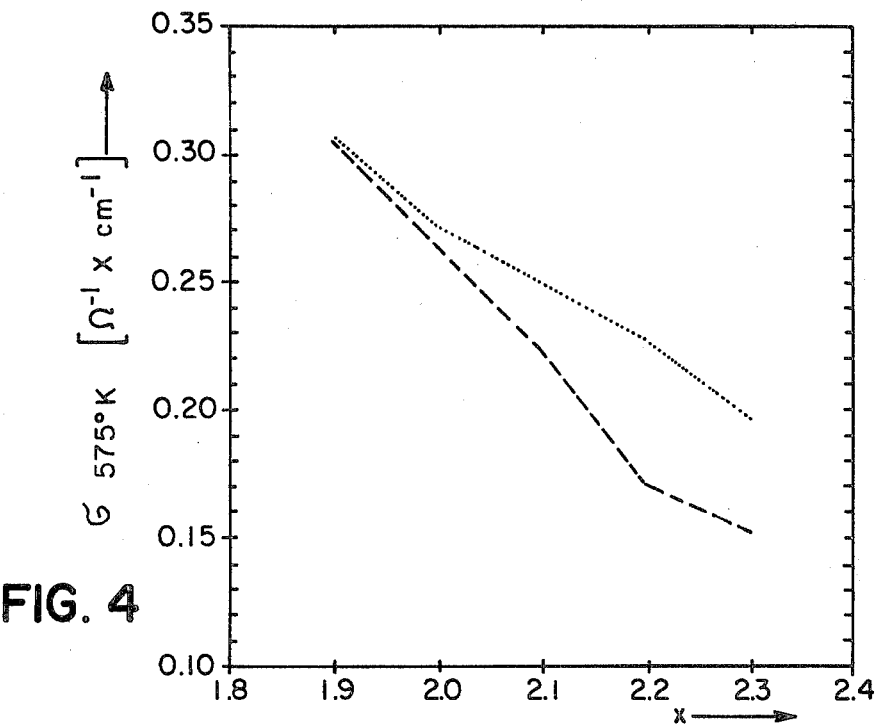

The success of this sinter treatment for mixed crystals of the preferred composition will be explained further by means of diagrammatic representations in the accompanying drawings wherein FIG. 1 shows the intentionally normalized intensity I of the strongest $ZrO_2$ x-ray reflection for $2\theta = 28.24°$ as a function of the stoichiometry x, FIG. 2 shows the density d of the mixed crystal sintered in accordance with the invention as a function of the stoichiometry x, FIG. 3 shows the electrical room temperature conductivity $\sigma$ 300° K. of the mixed crystal sintered according to the invention as a function of the stoichiometry x, and FIG. 4 shows the electrical high temperature conductivity $\sigma$ 575° K. of the mixed crystal sintered according to the invention as a function of the stoichiometry x.

FIG. 1 clearly shows that the free $ZrO_2$ in the mixed crystal dissappears completely at a composition $x=2.2$. Only the surfaces of the sinter body were analyzed, the interior is $ZrO_2$-free in any event. The comparability of the sinter samples is shown by the comparable magnitudes of the strongest x-ray reflections of the mixed crystal series for $2\theta = 30.5°$ (not shown here).

As shown in FIG. 2, because of the oxygen sintering (dashed curve) the density of the mixed crystal series embodying the invention experiences a significant increase over the air sintering (dotted curve).

As shown in FIG. 3, the increase of the stoichiometry x from 1.9 to 2.2 causes an extraordinary increase in the ion conductivity $\sigma$ 300° K. (room temperature) up to about $11 \cdot 10^4 \Omega^{-1} cm^{-1}$. The oxygen sintering (dashed curve) also contributes to this, even though to a lesser extent in this instance. Utilization of the even better conductivity at the edge of the existence spectrum with $x=2.3$ is critical because, for this composition, there is great danger that the slightest stoichiometric change will cause the phase to become rhomboidal and therefore poorly Na-ion conductive.

The high temperature conductivities $\sigma$ 575° K. (about 300° c.) are shown as a function of the stoichiometry x in FIG. 4 (inventive oxygen sintering in dashed lines, air sintering in dotted lines).

These are interesting as regards the use of the mixed crystals as the solid electrolyte in Na/S cells. In these there is shown a conductivity of on the average $0.2\Omega^{-1}cm^{-1}$ which is well suited to the functioning in a cell.

To supplement the drawings, the following Table 1 provides a comparison between the mixed crystal embodying the invention and known mixed crystals according to the formula $Na_{1+x}Zr_{2-\frac{1}{3}x}Si_xP_{3-x}O_{12-\frac{2}{3}x}$, with respect to ion conductivity $\sigma$, activation energy $E_a$ and density D. These numerical examples provide definite proof of the preferred status of the mixed crystals embodying the invention.

TABLE 1

|  | $\sigma_{RT}$ ($\omega^{-1}cm^{-1}$) | $\sigma_{300°C.}$ ($\omega^{-1}cm^{-1}$) | $E_a$ (kj/mole) | D (g/cm³) |
|---|---|---|---|---|
| Known Mixed Crystal | | | | |
| x = 2.2 | $4.4 \cdot 10^{-5}$ | $6 \cdot 10^{-2}$ | 41 | 2.97 |
| x = 2.0 | $1.9 \cdot 10^{-4}$ | 0.15 | 38 | 2.85 |
| New Mixed Crystal | | | | |
| x = 2.2 | $1 \cdot 10^{-3}$ | 0.23 | 32 | 3.02 |
| x = 2.0 | $3.4 \cdot 10^{-4}$ | 0.15 | 35 | 3.04 |

We claim:

1. A mixed crystal for use as the ion conductive solid electrolyte in galvanic elements formed of the components $Na_2O$, $ZrO_2$, $P_2O_5$ and $SiO_2$, wherein the composition is expressed by the general formula $$Na_{1+ax}Zr_{2+\frac{2}{3}x-ax}Si_xP_{3-x}O_{12\frac{2}{3}x},$$

a being a constant with a numerical value between 0.8 and 0.9 and x being a variable parameter with numerical values of 1.8 to 2.3.

2. The mixed crystal of claim 1 wherein x has the numerical value 2.2 and a has the numerical value 0.88.

* * * * *